US005482865A

United States Patent [19]

Ferrieri et al.

[11] Patent Number: 5,482,865

[45] Date of Patent: Jan. 9, 1996

[54] APPARATUS AND METHOD FOR PREPARING OXYGEN-15 LABELED WATER $H_2[^{15}O]$ IN AN INJECTABLE FORM FOR USE IN POSITRON EMISSION TOMOGRAPHY

[75] Inventors: Richard A. Ferrieri, Patchogue; David J. Schlyer, Bellport; David Alexoff, Westhampton, all of N.Y.

[73] Assignee: Associated Universities, Inc., Washington, D.C.

[21] Appl. No.: 258,053

[22] Filed: Jun. 10, 1994

[51] Int. Cl.$^6$ .................................................. G01N 37/00

[52] U.S. Cl. ...................... 436/56; 250/363.03; 376/199; 472/81; 472/903; 436/57; 436/813; 436/174

[58] Field of Search ................................ 436/11, 56, 57, 436/813, 174; 422/81, 903; 376/199; 250/363.3

[56] References Cited

U.S. PATENT DOCUMENTS

| | | | |
|---|---|---|---|
| 4,567,748 | 2/1986 | Klass et al. | 436/11 X |
| 5,037,602 | 8/1991 | Dabiri, et al. | 376/198 |
| 5,082,980 | 1/1992 | Berridge | 568/917 |
| 5,223,434 | 6/1993 | Kanno et al. | 436/56 |

FOREIGN PATENT DOCUMENTS

| | | |
|---|---|---|
| 60-4900 | 1/1985 | Japan . |

OTHER PUBLICATIONS

G. Miksa *Chem. Abstr.* 1967, 67, 36315d.

D. R. Christman et al, *J. Nucl. Med.* 1973, 14, 864–866. R. J.

R. J. Nickles et al, *Prog. Nucl. Med.* 1978, 4, 72–79.

P. V. Harper et al., *J. Label. Comp. Radiopharm.* 1981, 18, 186.

Jili *Chem. Abstr.* 1982, 97, 60991m.

S. C. Jones et al., *Int. J. Appl. Radiat. Isot.* 1984, 35, 721–729.

Y. Miyake et al., *Chem. Abstr.* 1989, 110, 82466h.

G. K. Mulholland et al., *J. Label. Comp. Radiopharm.* 1991, 30, 89.

BNL 49217, Ferrieri, et al., "A Simple System for Remote Processing of $H_2[^{15}O]$Produced from a N2/H2 Gas Target", Tenth Int. Symp. on Radiopharmaceutical Chemistry, Kyoto, Japan, Oct. 25–28, 1993.

BNL 49676, Ferrieri, et al., "A Simple System for Remote Processing and Delivery of $H_2[^{15}O]$Produced from a $N_2/H_2$Gas Target", Fifth Int. Workshop on Targetry & Target Chemistry, Upton, N.Y., Sep. 19–23, 1993.

Jackson, et al., "$[^{15}O]H_2O$, $[^{15}O]O_2$and $[^{15}O]CO$ Gas Production, Monitoring and Quality Control System", Appl. Radiat. Isot., vol. 3, pp. 631–634, 1993.

Berridge, et al., "Low–Carrier Production of $[^{15}O]$Oxygen, Water and Carbon Monoxide", Appl. Radiat. Isot., vol. 41, No. 12, pp. 1173–1175, 1990.

Clark, et al., "Current Methodology for Oxygen–15 Production for Clinical Use*", Int. J. Radiat. Appl. Instrum. Part A, 1987.

(List continued on next page.)

*Primary Examiner*—James C. Housel
*Assistant Examiner*—Arlen Soderquist
*Attorney, Agent, or Firm*—Margaret C. Bogosian

[57] ABSTRACT

A handling and processing apparatus for preparing Oxygen-15 labeled water ($H_2[^{15}O]$) in injectable form for use in Positron Emission Tomography from preferably $H_2[^{15}O]$ produced by irradiating a flowing gas target of nitrogen and hydrogen. The apparatus includes a collector for receiving and directing a gas containing $H_2[^{15}O]$ gas and impurities, mainly ammonia ($NH_3$) gas into sterile water to trap the $H_2[^{15}O]$ and form ammonium ($NH_4^+$) in the sterile water. A device for displacing the sterile water containing $H_2[^{15}O]$ and $NH_4^+$ through a cation resin removes $NH_4^+$ from the sterile water. A device for combining the sterile water containing $H_2[^{15}O]$ with a saline solution produces an injectable solution. Preferably, the apparatus includes a device for delivering the solution to a syringe for injection into a patient. Also, disclosed is a method for preparing $H_2[^{15}O]$ in injectable form for use in Positron Emission Tomography in which the method neither requires isotopic exchange reaction nor application of high temperature.

16 Claims, 5 Drawing Sheets

OTHER PUBLICATIONS

Welch, et al., "A Remote System for the Routine Production of Oxygen-15 Radiopharmaceuticals", J. of Labelled Compounds and Radiopharmaceuticals–vol. XXII, No. II, 1985.

Ruiz, et al., "Direct Synthesis of Oxygen-15 Labelled Water at High Specific Activities", J. of Labelled Compounds and Radiopharmaceuticals–vol. XV, pp. 185–189, 1978.

Mulholland, et al., "Direct Simultaneous Production of [$^{15}$O]Water and [$^{13}$N]Ammonia of [$^{18}$F]Fluoride Ion by 26 MeV Proton Irradiation of a Double Chamber Water Target", Appl. Radiat. Isot., vol. 41, No. 12, pp. 1193–1199, 1990.

APPARATUS AND METHOD FOR PREPARING OXYGEN-15 LABELED WATER H2[ 150] IN AN INJECTABLE FORM FOR USE IN POSITRON EMISSION TOMOGRAPHY

This invention was made with Government support under contract number DE-AC02-76CH00016, between the U.S. Department of Energy and Associated Universities, Inc. The Government has certain rights in the invention.

BACKGROUND

The present invention relates generally to an apparatus and method for preparing an injectable radiopharmaceutical. More particularly, the present invention relates to an apparatus and method for preparing $H_2[^{15}O]$ in an injectable form having application in Positron Emission Tomography (PET).

Through the emission of positrons from radiopharmaceuticals labeled with radioactive isotopes, PET permits imaging and measuring physiological process within the human body. Radioactive isotopes such as $^{18}F$, $^{11}C$, $^{15}O$, $^{13}N$ are typically used in labelling radiopharmaceuticals for use in PET. Radioactive isotopes are generated from a target compound selected to produce a desired radioactive isotope when bombarded by high energy particles such as accelerated protons or deuterons from a cyclotron. The half life associated with these radioactive isotopes is very short, typically on the order of minutes. Oxygen-15 possesses a half-life of 2.04 minutes.

Oxygen-15 labeled water ($H_2[^{15}O]$) is one of the most widely used radioactive isotopes in PET for assessing regional cerebral blood flow. There are several methods for producing $H_2[^{15}O]$.

$H_2[^{15}O]$ can be produced from either a palladium or platinum catalyzed reduction of Oxygen-15 labeled oxygen gas with hydrogen at elevated temperatures. Another method in which $H_2[^{15}O]$ can be produced is by an isotopic exchange between Oxygen-15 labelled carbon dioxide gas and water. This exchange is accomplished by continuously recirculating a gas flow containing Oxygen-15 labeled carbon dioxide through 8 to 10 milliliters of saline in a bubbling bag, and back into the irradiation target for further irradiation. A peristatic pump is used to recirculate the gas during this process. $H_2[^{15}O]$ can also be produced directly by the recoil production via in-target reaction of $^{15}O$ atoms generated by an $^{16}O(p,pn)^{15}O$ reaction on natural abundance water.

Still another method that $H_2[^{15}O]$ can be produced is by the recoil production via in-target reaction of $^{15}O$ atoms generated by a $^{14}N(d,n)^{15}O$ reaction on a nitrogen ($N_2$) gas and hydrogen ($H_2$) gas target. Most of the nitrogen does not experience a nuclear reaction to form $^{15}O$. The $^{15}O$ that is produced combines with the hydrogen to form $H_2[^{15}O]$. In addition to producing $H_2[^{15}O]$, other nuclear reactions occur to produce impurities. Specifically, a small amount of $^{13}N$ and $^{11}C$ are produced from the $^{14}N(d, dn)^{13}N$ and $^{14}N(d, \alpha n)^{11}C$ reactions, respectively. However, the most abundant impurity produced is ammonia ($NH_3$) gas. This impurity is produced as a consequence of in-target radiolysis, not as a result of a nuclear reaction. That is to say, the nitrogen gas and hydrogen gas ionizes and undergoes a radiolytic reaction to form ammonia gas.

SUMMARY

Accordingly, it is an object of the present invention to provide an apparatus for preparing $H_2[^{15}O]$ quickly and reliably in quantities and purities suitable for injection into human patients for PET studies.

It is also an object of the present invention to provide an apparatus that reduces radiation exposure to radiochemists and PET personnel in preparing $H_2[^{15}O]$ in a purified injectable form for use in PET.

It is another object of the present invention to provide an apparatus for preparing $H_2[^{15}O]$ in an injectable form in which the apparatus is adapted for receiving $H_2[^{15}O]$ gas via tubing from an irradiated target of flowing nitrogen and hydrogen gases, thereby permitting use of the apparatus remote from the target area and nearer to a patient under study in a PET facility.

It is still another object of the present invention to provide an apparatus that neither requires an isotopic exchange reaction nor application of high temperature for preparing $H_2[^{15}O]$ in a purified injectable form for use in PET.

It is a further object of the present invention to provide an apparatus that is simple in construction and may be manufactured easily and inexpensively for preparing $H_2[^{15}O]$ in sterile and pyrogen free form for use in PET.

Another object of the present invention is to provide a method for preparing $H_2[^{15}O]$ in purified injectable form for use in PET from $H_2[^{15}O]$ produced by irradiating a flowing gas target of nitrogen and hydrogen gas.

It is also an object of the present invention to provide a method for preparing $H_2[^{15}O]$ in a purified injectable form that neither requires an isotopic exchange reaction nor application of high temperature.

Certain of the foregoing and related objects are readily obtained in an apparatus for preparing $H_2[^{15}O]$ for use in Positron Emission Tomography, in which the apparatus includes a means for receiving and directing a gas containing $H_2[^{15}O]$ and at least one impurity into sterile water to trap the $H_2[^{15}O]$ and at least one impurity in the sterile water, a means for displacing the sterile water containing the trapped $H_2[^{15}O]$ and at least one impurity through an ion resin to remove at least one impurity from the sterile water, and a means for combining the sterile water containing the trapped $H_2[^{15}O]$ with a saline solution to produce an injectable solution.

Desirably, the apparatus further includes a means for venting excess gas from the sterile water, and a means for venting excess gas from the sterile saline. Most desirably, the apparatus includes means for delivering the solution to an injection syringe.

Preferably, the gas containing $H_2[^{15}O]$, supplied to the apparatus, is produced by irradiating a flowing gas target of nitrogen gas and hydrogen gas, wherein the flowing gas target is about 95% gas and about 5% hydrogen gas. Most preferably the at least one impurity is ammonia ($NH_3$) gas and trapped in the sterile water to form ammonium ($NH_4^+$). Desirably, the ion resin is a cation resin.

Certain of the foregoing and related objects are also readily obtained in a method for preparing $H_2[^{15}O]$ for use in Positron Emission Tomography, in which the method includes the steps of: receiving and directing a gas containing $H_2[^{15}O]$ and at least one impurity into sterile water to trap the $H_2[^{15}O]$ and the at least one impurity in the sterile water, displacing the sterile water containing the trapped $H_2[^{15}O]$ and the at least one impurity through an ion resin to remove the at least one impurity from the sterile water, and combining the sterile water containing $H_2[^{15}O]$ with a saline solution to produce an injectable solution.

Desirably, the method includes the steps of venting excess gas during the step of receiving and directing $H_2[^{15}O]$ gas and $NH_3$ gas, and venting excess gas during the step of combining the sterile water containing $H_2[^{15}O]$ gas with a saline solution. Most desirably, the method includes the step of delivering the solution to an injection syringe.

Preferably, the gas containing $H_2[^{15}O]$ for use in the method, is produced by irradiating a flowing gas target of nitrogen gas and hydrogen gas, wherein the flowing gas target is about 95% nitrogen gas and about 5% hydrogen gas. Most preferably, the at least one impurity is ammonia ($NH_3$) gas and trapped in the sterile water to form ammonium ($NH_4^+$). Desirably the ion resin is a cation resin.

BRIEF DESCRIPTION OF THE DRAWINGS

Other objects and features of the present invention will become apparent from the following detailed description considered in connection with the accompanying drawings, which disclose several embodiments of the invention. It is to be understood that the drawings are to be used for the purpose of illustration only and not as a definition of the limits of the invention.

In the drawings, wherein similar reference characters denote similar elements throughout the several views.

DETAILED DESCRIPTION

Apparatus

Figure 1:
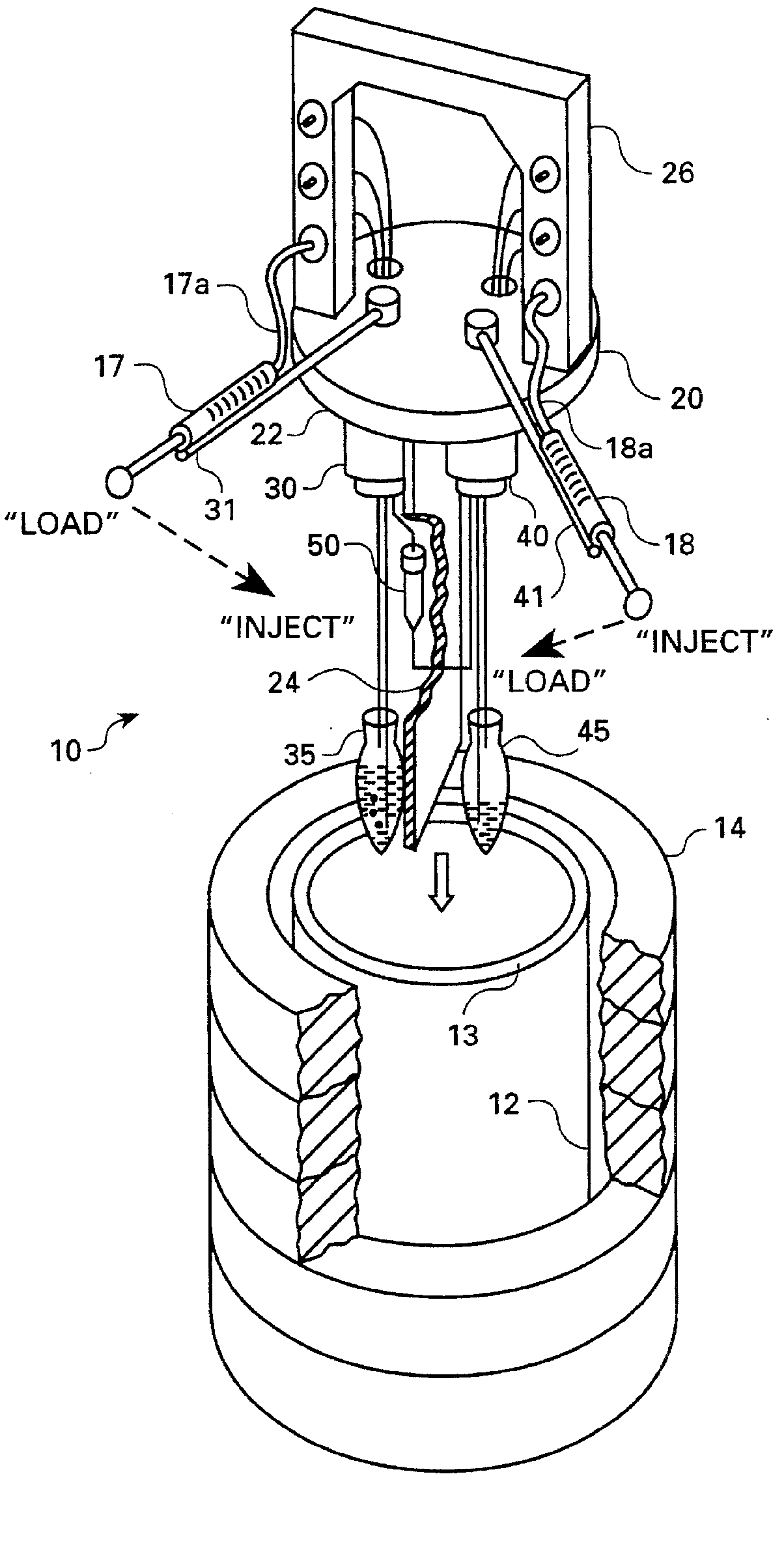
FIG. 1 is an exploded perspective view, partially broken away, of an apparatus embodying the present invention in which the apparatus is insertable in a dose calibrator and surrounding shielding.

Turning now to the drawings, FIG. 1 illustrates an apparatus 10 embodying the present invention for preparing $H_2[^{15}O]$ in sterile and pyrogen free form for use in Positron Emission Tomography (PET). A gas containing $H_2[^{15}O]$ to be prepared into injectable form by apparatus 10 is preferably produced by conventionally irradiating a flowing gas target of nitrogen gas and hydrogen gas. In addition to the production of $H_2[^{15}O]$ gas, is the production of impurities, mainly ammonia ($NH_3$) gas.

As shown in FIG. 1, the apparatus 10 may be inserted in the dose calibrator 12 by sliding in the direction of the downward arrow. Dose calibrator 12 permits measurement of the radioactivity during operation of apparatus 10 for preparing $H_2[^{15}O]$ in injectable form. Preferably, dose calibrator 12 is surrounded by a lead shield 14 to reduce radioactivity emission from apparatus 10, and thus, reduce radiation exposure to radiochemists and PET experts. A suitable dose calibrator 12 can be purchased from Capintec, Inc., model number CRC-12R. A suitable shield 14 can consist of eight 4 centimeters (cm) radially thick interlocking lead rings stacked around dose calibrator 12. Suitable shielding can be purchased from Capintec, Inc., part number CRC-245.

Apparatus 10 generally includes a first valve 30, a sterile water bubbler 35, an ion resin column 50, a second valve 40, and a sterile saline bubbler 45. A top plate 20 rests on an upper open edge 13 of dose calibrator 12 when apparatus 10 is fully inserted in dose calibrator 12. Attached to a bottom surface 22 of top plate 20 are valves 30 and 40, each having an extension handle 31 and 41, respectively, extending through top plate 20 and radially outward away from top plate 20. Bubblers 35 and 45 are attached to a vertical plate 24 depending from bottom surface 22 of top plate 20. A lifting handle 26 permits sliding apparatus 10 up and out of dose calibrator 12. Preferably, apparatus 10 is light weight and easily lifted from the dose calibrator 12 with top plate 20, lifting handle 26 and vertical plate 24 fabricated from light weight plastic, such as that sold under the trademark PLEXIGLASS. Bubblers 35 and 45 are suitable conventional test tubes fabricated from glass. Alternatively, crimp seal glass vials could be used. Suitable vials can be purchased from Alltech Inc., part number 98104. In addition, a separate removable shielding fabricated from suitable radiation absorbing material such as lead or steel can be configured to fit on top of top plate 20 to absorb radioactivity emissions that pass through top plate 20.

Figure 2:
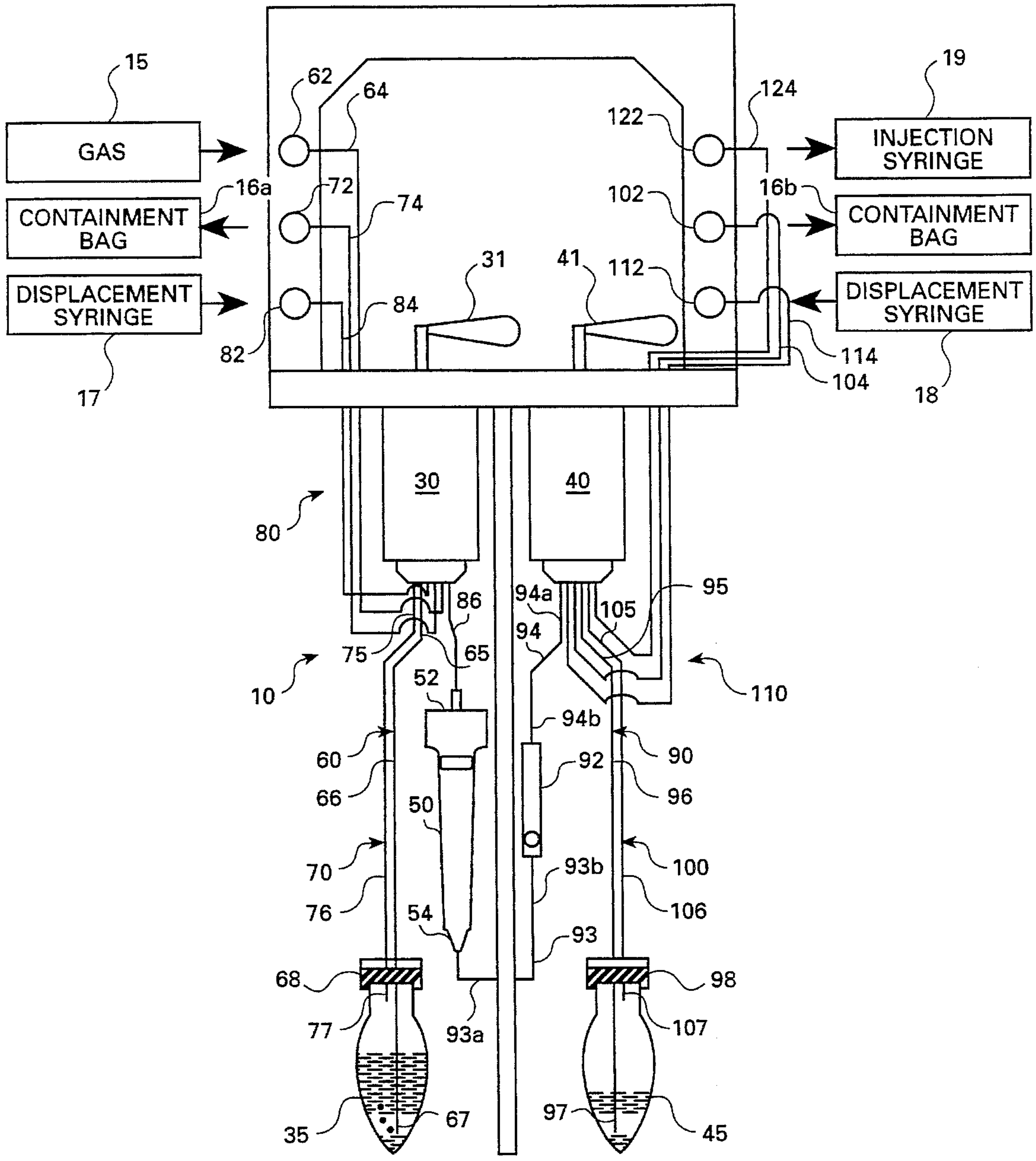
FIG. 2 is a front elevational view of the apparatus shown in FIG. 1.
Figure 3A:
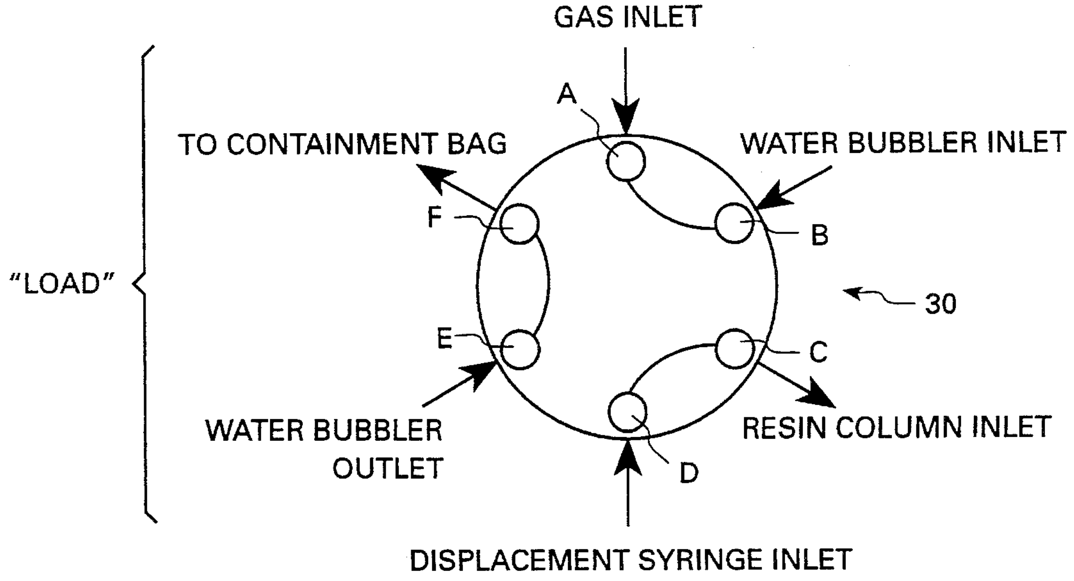
FIG. 3*a* is a schematic view of a first valve of the apparatus shown in FIG. 1, in which the first valve is in a first "Load" position to receive $H_2[^{15}O]$ gas and ammonia gas.
Figure 3B:
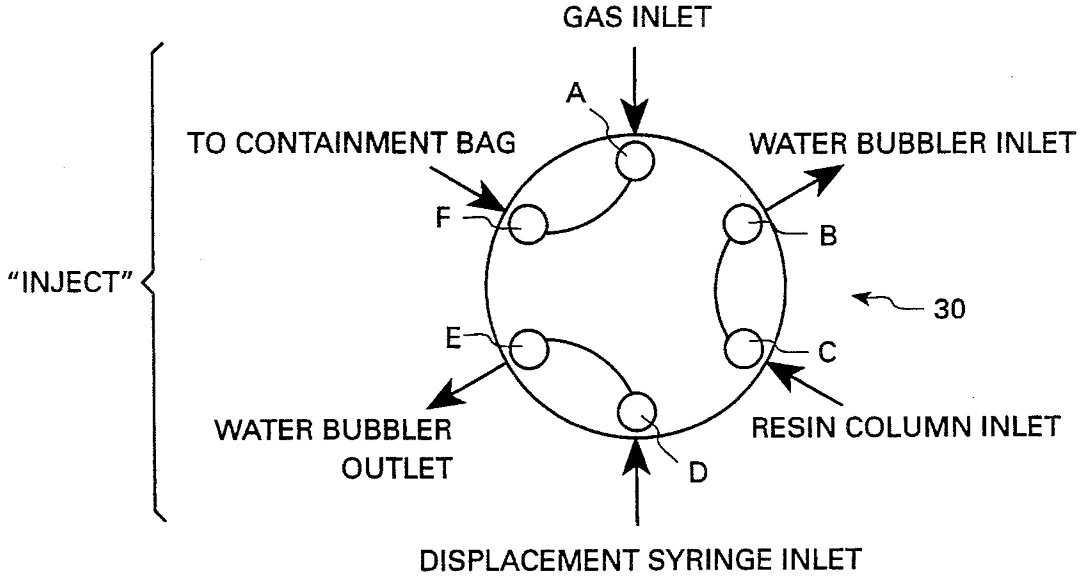
FIG. 3*b* is a schematic view of the first valve shown in FIG. 3*a*, in which the first valve is in a second "Inject" position.
Figure 4A:
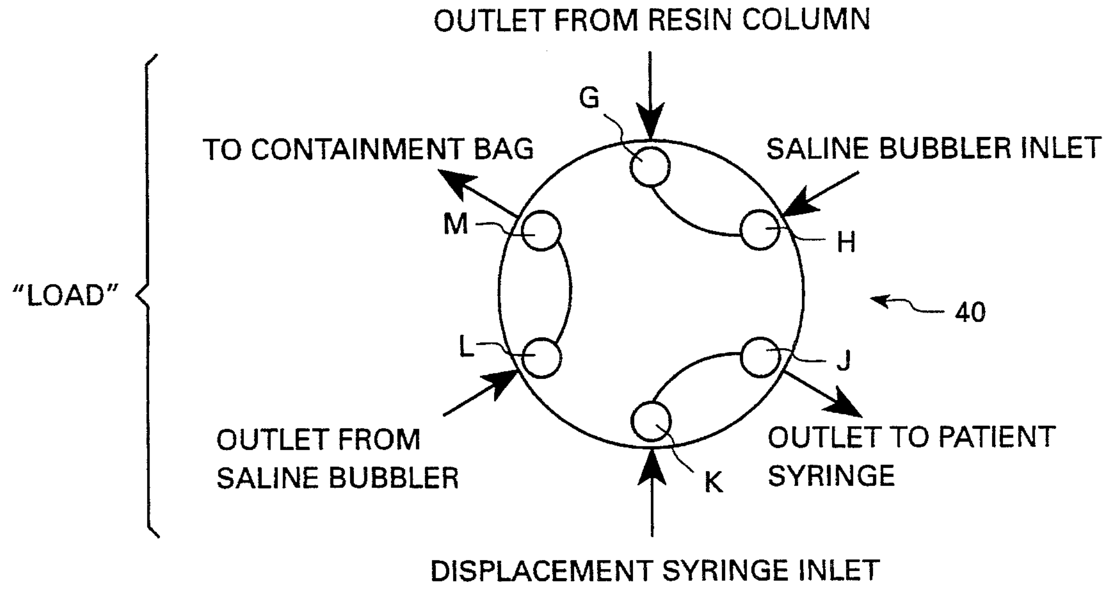
FIG. 4*a* is a schematic view of a second valve of the apparatus shown in FIG. 1, in which the second valve is in a first "Load" position.
Figure 4B:
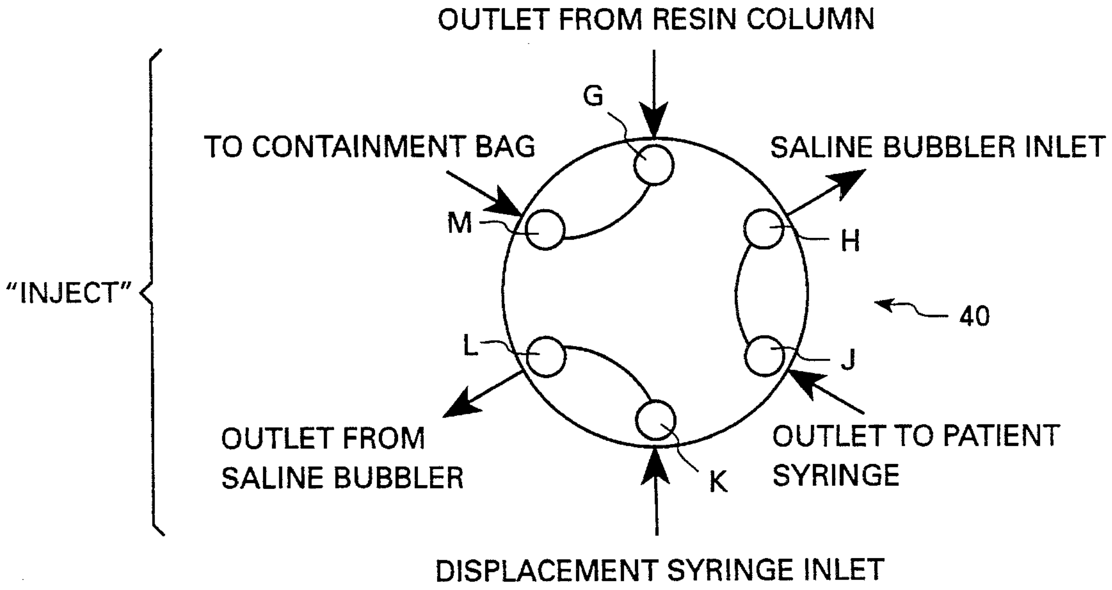
FIG. 4*b* is a schematic view of the second valve shown in FIG. 4*a*, in which the second valve is in a second "Inject" position.

Referring now to FIGS. 2, 3*a* and 3*b*, and 4*a* and 4*b*, valve 30 and valve 40 are two position six port valves. FIG. 3*a* shows valve 30 in a first "Load" position and FIG. 3*b* shows valve 30 in a second "Inject" position. Similarly, FIG. 4*a* shows valve 40 in a first "Load" position and FIG. 4*b* shows valve 40 in a second "Inject" position. Valve 30 and valve 40 are operatively switched between the "Load" position and "Inject" position by rotation of handle 31 and 41, respectively, as shown by the dashed arrows in FIG. 1. Valves 30 and 40 are available from Rainin, Inc., model Rheodyne 7010. Operative fluid communication through the various ports of valves 30 and 40 are described in detail in an Operation section below.

Referring to FIGS. 2, 3*a* and 3*b*, an inlet means 60 for receiving and directing a gas containing $H_2[^{15}O]$ and impurities, mainly ammonia ($NH_3$) gas into sterile water to trap the $H_2[^{15}O]$ and to particularly form ammonium ($NH_4^+$) in the sterile water. Inlet means 60 generally includes a fitting 62, a tube 64, valve 30 and a needle 66. Fitting 62 is attached to lifting handle 26 for connection with an inlet gas line 15 to receive the gas containing $H_2[^{15}O]$ and $NH_3$ gas. Tube 64 is connected at one end to fitting 62 and at the other end to a port A of valve 30. A port B of valve 30 is connected to end 65 of needle 66 and end 67 extends downwardly through a silicon rubber septa 68 that fits into sterile water bubbler 35. Specifically, needle 66 extends into the sterile water with end 67 disposed just above the bottom of sterile water bubbler 35.

Preferably, apparatus 10 includes a first venting means 70 for venting excess gas from sterile water bubbler 35. Venting means 70 generally includes a needle 76, valve 30, a tube 74 and a fitting 72. End 77 of needle 76 is disposed into an air space above the sterile water in sterile water bubbler 35. Needle 76 extends upwardly through silicon rubber septa 68 that fits into sterile water bubbler 35 and end 75 of needle 76 is attached to a port E of valve 30. A port F of valve 30 is connected to one end of tube 74 and the other end of tube 74 is connected to fitting 72. Fitting 72 is attached to lifting handle 26 for connection to a containment bag 16*a* to collect the excess gas and prevent release to the atmosphere and exposure to nearby personnel.

A displacing means 80 for displacing the sterile water containing $H_2[^{15}O]$ and $NH_4^+$ through ion resin column 50 to remove the $NH_4^+$, generally includes a fitting 82, tube 84, valve 30, needle 76, needle 66, and a tube 86. Fitting 82 is attached to lifting handle 26 with fitting 82 connected via hose 17*a* to a syringe 17 containing air. Syringe 17 is suitably attached to handle 31 making a compact design. Tube 84 is connected at one end to fitting 82 and at the other end to a port C of valve 30. A port D of valve 30 is connected to one end of tube 86 with the other end of tube 86 adapted for attachment to ion resin column 50 at end 52. A suitable cation resin column for use in apparatus 10 to remove the $NH_4^+$ is a ion resin manufactured by Bio-Rad Laboratories., Inc., model AG50W-X8 Polyprep Column.

Referring now to FIGS. 2, 4*a* and 4*b*, a combining means 90 for combining the sterile water containing substantially only trapped $H_2[^{15}O]$ with a saline solution to produce an injectable solution, generally includes tubes 93 ,and 94, valve 40, a needle 96. End 93*a* of tube 93 is adapted for attachment to ion resin column 50 and end 93*b* of tube 93 is adapted for attachment to one end of check valve 92. End 94*b* of tube 94 is adapted for attachment to the other end of check valve 92 and end 94*a* of tube 94 is attached to a port G of valve 40. Check valve 92 permits fluid transmission in the direction of valve 30 to valve 40 and prevents fluid transmission in the reverse direction, valve 40 to valve 30. A suitable check valve for these purposes is manufactured by Lee Co., model Instac. A port H of valve 40 is connected to end 95 of needle 96 having an end 97 extending downward through a silicon rubber septa 98 that fits into sterile saline bubbler 45. Specifically, needle 96 extends into the saline water with end 97 disposed just above the bottom of sterile saline bubbler 45.

Preferably, apparatus 10 includes a second venting means 100 for venting excess gas from sterile saline bubbler 45. Venting means 100 generally includes a needle 106, valve 40, a tube 104 and a fitting 102. End 105 of needle 106 is attached to a port L of valve 40 and needle 106 extends downwardly through silicon rubber septa 98 that fits into sterile saline bubbler 45. End 107 of needle 106 is disposed into an air space above the sterile saline in sterile saline bubbler 45. A port M of valve 40 is connected to one end of tube 104 and the other end of tube 104 is connected to fitting 102. Fitting 102 is attached to lifting handle 26 for connection with a containment bag 16*b* to receive excess gas and prevent release to the atmosphere and exposure to nearby personnel. Desirably, apparatus 10 includes a displacing means 110 for delivering the injectable solution to an injection syringe 19. Displacing means 110 generally includes a fitting 112, a tube 114, valve 40, needle 106, needle 96, a tube 124, and a fitting 122. Fitting 112 is attached to lifting handle 26 with fitting 112 connected via a hose 18*a* to a syringe 18 containing air. Syringe 18 is suitably attached to handle 41 making a compact design. Tube 114 is connected at one end to fitting 112 and at the other end to a port K of valve 40. A port J of valve 40 is connected to one end of tube 124 with the other end of tube 124 connected to fitting 122 that is adapted to connect to a syringe (not shown) that is used for injection of the injectable solution containing $H_2[^{15}O]$ into a patient.

Conventional 1.6 millimeters outside diameter stainless steel tubing is suitable for use for the tubes described above. Standard High Pressure Liquid Chromatography fittings manufactured by Rheodyne, Inc. are suitable for the connection between the tubing and the various ports of valves 30 and 40. Fittings 82 and 112 which connect to displacement syringes 17 and 18 are available from Aldrich Chemical Co. part number 218,214-1. Quick disconnect fitting 62 which connects to the incoming gas containing $H_2[^{15}O]$ and impurities, and fitting 74 and 102 which connect to containment bags 16*a* and 16*b* respectively, are available from Swagelok Co. part number QC4-S-200. Needles 66 and 76, 96 and 106 which connect valves 30 and 40 to bubblers 35 and 45, respectively, are available from Aldrich Chemical Co., part number 210,114-1.

Operation

The operation of the present invention will be explained with respect to FIGS. 1–4, for preparing $H_2[^{15}O]$ in sterile and pyrogen free form for use in PET. Referring to FIGS. 1 and 2, set-up of apparatus 10 requires placing 6 milliliters (ml) of sterile water in sterile water bubbler 35, placing 1.6 ml of 5% sterile saline in sterile saline bubbler 45, and connecting ion resin column 50 to tubes 86 and 94. Both handles 31 and 41, respectively of valves 30 and 40, are placed in the "Load" positions.

The production of $H_2[^{15}O]$ for use in apparatus 10 is preferably accomplished by bombarding a flowing gas containing about 95% nitrogen and 5% hydrogen with high energy deuterons. A target for containing the flowing gas is of a standard cylindrical design and constructed from aluminum having a 100 ml active volume. A front window of the target uses a 0.5 mm thick aluminum (6061) sheet which degrades an 8 MeV deuteron beam down to 7.2 MeV for interacting with the flowing gas. Typically, the target is operated in a flow mode at 4 liters per minute of flowing gas at 60 psi. A 15 μA beam intensity of radiation is applied to the flowing gas for approximately three (3) minutes. The gas of nitrogen and hydrogen containing $H_2[^{15}O]$ and impurities mainly, ammonia ($NH_3$), are conveniently transferred to a distant PET facility through a suitable 3.18 mm outside diameter Impolene (manufactured by Imperial—Eastman Co., part number 22-pp-1/8) line tube (not shown) to apparatus 10. At Brookhaven National Laboratory, a 120 meter long line tube transports the resulting gas containing $H_2[^{15}O]$ and impurities to the PET facility and to apparatus 10.

Referring to FIGS. 2 and 3*a*, in the "Load" positions, port A and B of valve 30 are in fluid communication and the gas containing $H_2[^{15}O]$ gas and $NH_3$ gas flow into sterile water bubbler 35 containing sterile water to trap $H_2[^{15}O]$ and form ammonium $NH_4^+$ in the sterile water. Ports C and D of valve 30 are also in fluid communication and excess gas containing mainly unreacted nitrogen ($N_2$) and hydrogen ($H_2$) gas which has a low solubility in sterile water as well as $H_2[^{15}O]$ gas and ammonia gas flows from the top of sterile water bubbler 35 for containment in containment bag 16*a*, thus preventing release to the atmosphere and exposure to nearby personnel. Within approximately five (5) minutes from the start of bombarding the nitrogen gas and hydrogen gas with high energy particles, approximately 300 millicuries (mCi) of $H_2[^{15}O]$ accumulates in the sterile water as measured by dose calibrator 12. At the accumulated amount of 300 mCi of $H_2[^{15}O]$ in the sterile water, the radiation level at the outer surface of shield 14 is less than twenty (20) millirads per hour.

Referring now to FIGS. 2, 3*b* and 4*a*, after 300 mCi of $H_2[^{15}O]$ gas is trapped in the sterile water, valve 30 is repositioned to "Inject" and valve 40 is positioned to "Load." Port D and port E of valve 30 are in fluid communication and 60 ml of air injected from syringe 17 (FIG. 1 ) pressurizes sterile water bubbler 35 to displace the sterile water containing $H_2[^{15}O]$ and $NH_4^+$ through port B and port C of valve 30 which are in fluid communication and through ion resin column 50 and then through check valve 92. Port G and H of valve 40 are also in fluid communication permitting the sterile water containing trapped $H_2[^{15}O]$ with the $NH_4^+$ removed to enter sterile saline bubbler 45 containing sterile saline. Ports L and M of valve 40 are also in fluid communication and excess gas flows from the top of sterile water bubbler 35 for containment in containment bag **16*b*, thus preventing release to the atmosphere and exposure to nearby personnel. The 1.6 ml of 5% sterile saline is sufficient to make the sterile water containing $H_2[^{15}O]$ isotonic (0.9% NaCl). Initially the sterile water containing $H_2[^{15}O]$ has a pH of 9.5 which is unacceptable for human use. After combining with the saline water, the pH falls to within a range of about 5.5 to about 7.0 which is acceptable for injection into a patient. Check valve 92 adds increased safety for preventing the saline solution in saline bubbler 45 from accidentally being transmitted to ion resin column 50. Hydrogen chloride is produced, should the saline solution reach ion resin column 50**.

Valve 40 is repositioned to "Inject" and a 60 ml charge of air from syringe 18 pressurizes sterile saline bubbler 45 to displace the saline solution preferably through a fitting 122 and preferably through a sterile line (not shown), a vented millipore filter (not shown) and into a 10 ml injection syringe. Apparatus 10 can prepare for injection 100 mCi of $H_2[^{15}O]$ (>99% radiochemically pure) by starting with 300 mCi of $H_2[^{15}O]$ trapped in sterile water bubbler 35. However, to date no more than 40 mCi have been injected into humans for PET studies performed at Brookhaven National Laboratory.

Apparatus 10 is easily prepared for subsequent injections of $H_2[^{15}O]$ for use in PET. Specifically, apparatus 10 is removed from dose calibrator 12, sterile water bubbler 35 is recharged, sterile saline bubbler 45 is recharged, and ion resin column 50 is replaced. Within approximately 12 minutes from the end of a first run, apparatus 10 is available for a second run.

It will be appreciated that a plurality of single valves or other valve configuration could be equally used in place of the valves described in the disclosed embodiment of the invention above to accomplish preparation of $H_2[^{15}O]$ in purified injectable form. In addition, electric motor means and pressurized means can be also employed to more fully automate apparatus 10 for the preparing of $H_2[^{15}O]$ for use in PET.

Method

Figure 5:
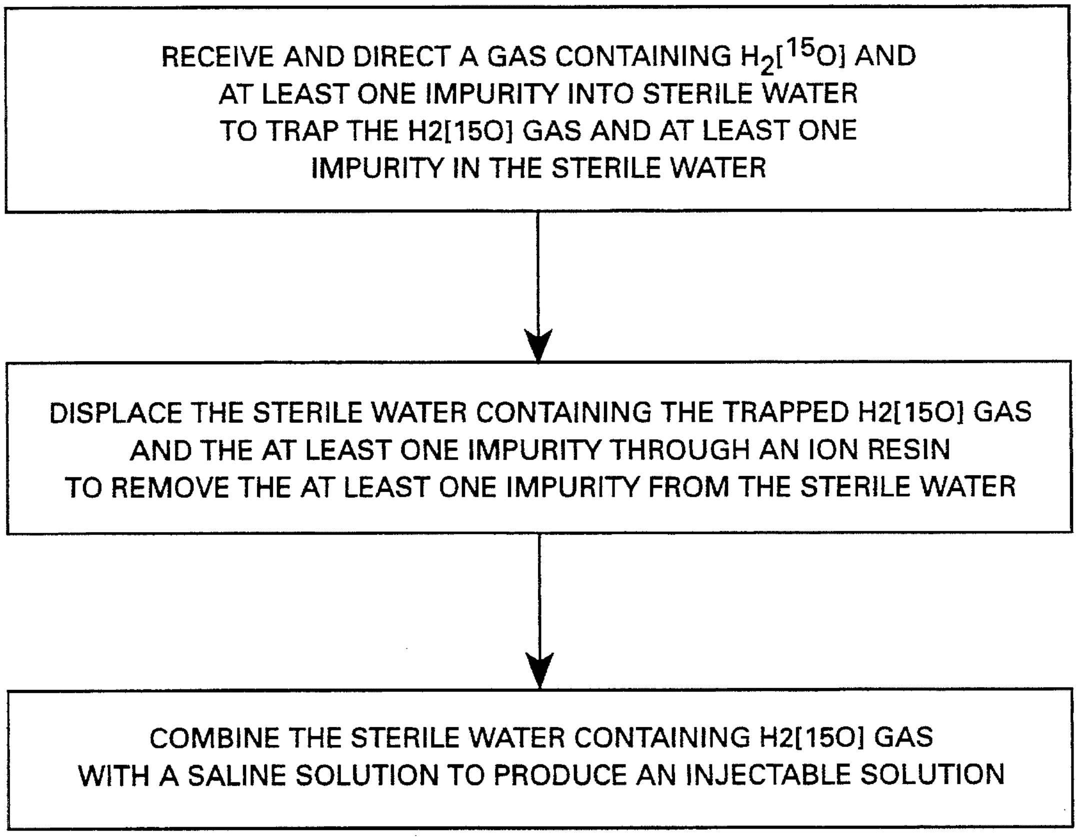
FIG. 5 is a flow chart illustrating the method of the present invention.

The method according to the present invention for preparing $H_2[^{15}O]$ for use in Positron Emission Tomography is illustrated in FIG. 5, and includes the steps of receiving and directing $H_2[^{15}O]$ gas and ammonia ($NH_3$) gas into sterile water to trap $H_2[^{15}O]$ and form ammonium ($NH_4^+$) in the sterile water, displacing the sterile water containing $H_2[^{15}O]$ and $NH_4^+$ through a cation resin to remove $NH_4^+$, and combining the sterile water containing $H_2[^{15}O]$ with a saline solution to produce an injectable solution.

Preferably, the method further includes venting excess gas during the step of receiving and directing the $H_2[^{15}O]$ gas and $NH_3$ gas, and venting excess gas during the step of combining the sterile water containing $H_2[^{15}O]$ with a saline solution. Most desirable, the method also includes the step of delivering the injectable solution to an injection syringe.

Thus, while only several embodiments of the present invention have been shown and described, it is obvious that many changes and modification may be made thereunto without departing from the spirit and scope of the invention.

We claim:

1. An apparatus for preparing $H_2[^{15}O]$ for use in Positron Emission Tomography, comprising:

means for receiving and directing a gas containing $H_2[^{15}O]$ and at least one impurity into sterile water to trap the $H_2[^{15}O]$ and the at least one impurity in the sterile water;

means for displacing the sterile water containing the trapped $H_2[^{15}O]$ and the at least one impurity through an ion resin to remove the at least one impurity from the sterile water; and means for combining the sterile water containing the trapped $H_2[^{15}O]$ with a saline solution to produce an injectable solution.

2. The apparatus according to claim 1, further including a means for venting excess gas from the sterile water.

3. The apparatus according to claim 2, further including means for venting excess gas from the sterile saline.

4. The apparatus according to claim 1, further including means for delivering the injectable solution to an injection syringe.

5. The apparatus according to claim 1, wherein the at least one impurity is ammonia ($NH_3$) gas.

6. The apparatus according to claim 5 wherein the trapped ammonia ($NH_3$) gas in the sterile water forms ammonium ($NH_4^+$).

7. The apparatus according to claim 6, wherein the ion resin is a cation resin.

8. A method for preparing $H_2[^{15}O]$ for use in Positron Emission Tomography, comprising the steps of:

receiving and directing a gas containing $H_2[^{15}O]$ and at least one impurity into sterile water to trap the $H_2[^{15}O]$ and the at least one impurity in the sterile water;

displacing the sterile water containing the trapped $H_2[^{15}O]$ and the at least one impurity through an ion resin to remove the at least one impurity from the sterile water; and combining the sterile water containing $H_2[^{15}O]$ with a saline solution to produce an injectable solution.

9. The method according to claim 8, further including the step of venting excess gas during the step of receiving and directing $H_2[^{15}O]$ gas and at least one impurity.

10. The method according to claim 9, further including the step of venting excess gas during the step of combining the sterile water containing the trapped $H_2[^{15}O]$ with a saline solution.

11. The method according to claim 8, further including the step of delivering the injectable solution to an injection syringe.

12. The method according to claim 8, wherein the gas containing $H_2[^{15}O]$ is produced by irradiating a flowing gas target of nitrogen gas and hydrogen gas.

13. The method according to claim 12, wherein the flowing gas target of about 95% nitrogen gas and about 5% hydrogen gas.

14. The method according to claim 8, wherein the at least one impurity is ammonia ($NH_3$) gas.

15. The method according to claim 14, wherein the trapped ammonia ($NH_3$) gas in the sterile water forms ammonium ($NH_4^+$).

16. The method according to claim 15, wherein the ion resin is a cation resin.

* * * * *